April 28, 1942 ,281,100
METHOD OF MANUFACTURING LIGHT POLARIZERS
Filed Feb. 23, 1939
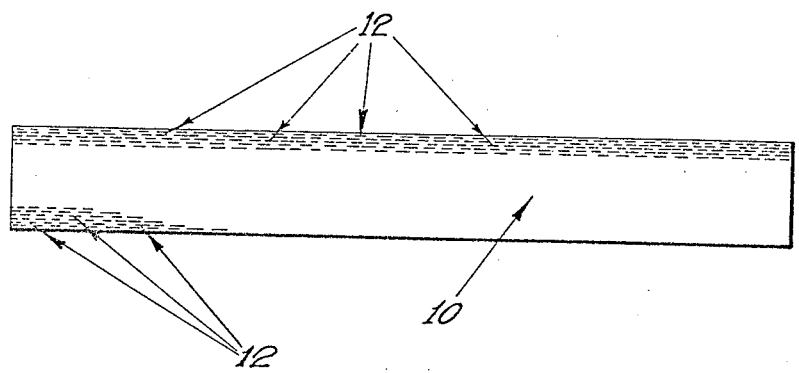
INVENTOR.
Edwin H. Land
BY
Brown & Jones
ATTORNEYS Patented Apr. 28, 1942

2,281,100

UNITED STATES PATENT OFFICE 2,281,100

METHOD OF MANUFACTURING LIGHT POLARIZERS

Edwin H. Land, Boston, Mass., assignor to Polaroid Corporation, Dover, Del., a corporation of Delaware Original application February 24, 1938, Serial No. 192,241. Divided and this application February 23, 1939, Serial No. 257,813

7 Claims. (Cl. 18—57).

This invention relates to a new and improved method of manufacturing a light-polarizer.

This application is a division of my co-pending application Serial No. 192,241, filed February 24, 1938, for new and improved Light-polarizer and method of making same.

An object of the invention is to provide a method of making a light-polarizer comprising a multiplicity of optically-oriented light-polarizing particles permanently embedded in one surface at least of a sheet of plastic material.

A further object of the invention is to provide a method of making such a polarizer wherein the particles employed are roughly needle-shaped and minute, and preferably from the group of related alkaloids of which herapathite may be considered as typical.

Still further objects of the invention are to provide a process for the manufacture of a light-polarizing material wherein a mass of light-polarizing particles is applied to the surface of a transparent supporting sheet or film in the presence of a solvent for the sheet; to orient the particles after application to the transparent supporting sheet and in the presence of the solvent therefor; to cause evaporation of the solvent while the particles are in oriented position; to press the particles during the orientation thereof into intimate contact with the softened or dissolved portion of the supporting sheet; and to permit evaporation of the solvent under such conditions that the material of the supporting sheet grips and envelops the polarizing particles, incorporating them into the sheet itself.

Other objects of the invention will in part be obvious and will in part appear hereinafter.

The invention accordingly comprises the several steps and the relation of one or more of such steps with respect to each of the others which will be exemplified in the following detailed disclosure, and the scope of the application of which will be indicated in the claims.

For a fuller understanding of the nature and objects of the invention, reference should be had to the following detailed description, taken in connection with the accompanying drawing, which is an enlarged sectional view representing diagrammatically one form of the product of the present invention.

Two distinct types of light-polarizing elements comprising oriented crystalline particles have heretofore been developed. In one such type, which is among those now sold commercially under the trade name "Polaroid," a mass of minute, light-polarizing particles is incorporated in a softened plastic and distributed therethrough, and a polarizing sheet or film formed therefrom by subjecting the entire suspension to a stress such that the plastic is extended while in softened condition and the particles thus oriented. The extension of the plastic and orientation of the particles has been accomplished by flowing the plastic, by rolling, smearing, extruding, or stretching it. In this type of polarizer the finished form of the polarizing element is obtained during the orientation of the polarizing particles which are substantially uniformly distributed throughout the entire polarizing sheet or film.

In the other type of polarizer a transparent support, such for example as a glass plate, is coated with polarizing crystalline material, the coating being applied under such conditions that the crystalline particles are substantially oriented optically upon the supporting surface. The particles may be adhesively affixed to the surface, but in this type of polarizer they do not enter into the supporting transparent plate, and they may ordinarily be easily removed from the support.

It is an object of this invention to provide a still different type of light-polarizer and a new method for the manufacture of a light-polarizing film or sheet. This invention contemplates the production of a unitary light-polarizing element free from any cement or adhesive material wherein light-polarizing particles of the type employed in the manufacture of sheet polarizing materials such as are sold under the trade name "Polaroid" are incorporated in a transparent supporting plate or sheet after the sheet has been formed by applying to one surface at least of the sheet a solvent or softener therefor whereby that portion of the sheet closely adjacent the surface is softened, and by then incorporating the polarizing crystals into a thin, softened layer or film on the surface of the supporting plate or sheet and orienting the crystals within that softened layer, the orientation of the crystals being retained as the solvent volatilizes and the softened layer hardens. This may be accomplished without destroying the physical properties of the supporting plate, for the solvent may affect only a small portion thereof.

The resulting product is shown in the drawing, wherein 10 represents the supporting plate or sheet, and 12 the individual light-polarizing particles, which are seen to be concentrated adjacent a surface of the sheet, the main portion of which remains free of particles and unaffected by their incorporation into the surface layer. It will be apparent that the product of the present invention is a unitary structure, for the particles are actually embedded within the supporting medium and may not be scratched or rubbed therefrom. It will be apparent, also, that the physical properties of the product of the invention remain those of the pre-formed supporting plate or sheet, i. e., if that sheet be made of an elastic material the polarizer itself will be elastic.

Various materials may be employed as the supporting, sheet-like element of the product of the invention. Preferably this element may comprise a plastic. It may, for example, comprise nitrocellulose or cellulose acetate or ethyl cellulose, or other cellulosic compounds, such for example as cellulose acetate propionate, or it may comprise a vinyl compound, such for example as polymerized vinyl chloride or vinyl acetate or combinations thereof, or the material sold commercially under the trade name "Vinylite XYSG," or it may comprise other synthetic resins, such for example as methyl methacrylate, or the material sold commercially under the trade name "Lucite," or other resins or like materials may be employed.

It will be apparent that combinationns of the materials mentioned, where compatible, may be employed. It is desirable only that the supporting sheet be light-transmitting, and that its surface may be softened by a solvent or volatile plasticizer which may preferably be the solvent in which the polarizing crystals to be incorporated in the surface layer of the sheet are formed by precipitation.

The physical properties of the materials adapted for use in the present invention as supporting elements are well known and they may be altered in manners heretofore known by incorporation therewith of suitable plasticizers. Such plasticizers may be employed provided their introduction into the sheet does not adversely affect the polarizing properties of the polarizing crystals employed.

The supporting sheet may be of any desired thickness. If a substantially rigid light-polarizing element is desired, a thick sheet may be employed, and an advantage of the present invention is that such a thick, rigid light-polarizer may be obtained without the need of laminating a thin polarizing film to a thicker supporting plate.

The light-polarizing particles preferably employed in the present invention are particles such as are described and claimed for example in my United States Letters Patent No. 1,951,664, which issued March 20, 1934. These are minute, colloid-like particles of a periodide of a sulfate of an alkaloid of the related group comprising quinine, quinidine, cinchonine, and cinchonidine, and more particularly such particles of the material known as herapathite. These particles are preferably formed of needle shape in the manner described in the said patent by precipitation from solution, and they may, if desired, be precipitated in a solution comprising a solvent for the sheet or film with which they are to be incorporated. For example, if it is desired to incorporate the particles in a sheet of cellulose acetate, they may be formed in a solvent comprising a mixture of methanol and ethyl acetate in such proportions that it will act as a solvent for the cellulose acetate sheet. The particles may then be incorporated in the surface film of the sheet, either by first softening the surface of the sheet by applying thereto a small amount of a suitable solvent therefor and then spreading the particles over the surface and orienting them by smearing or rubbing them into the softened surface, care being taken to smear or rub the particles in one direction only if it is desired that the polarizing axis of the finished product be uniformly in one direction, or the particles in suspension in the solvent may be applied to the surface and rubbed or smeared together with the solvent across the surface, the solvent softening the surface as the particles are rubbed thereinto.

The process thus comprises the steps of applying to at least one surface of a light-transmitting supporting element a substance which softens the surface, spreading on to the softened surface a multiplicity of light-polarizing particles, orienting the particles upon the softened surface, and pressing the particles firmly into the softened film, so that they are embedded in the supporting element adjacent one surface thereof when the softened film sets or hardens It will be apparent that in lieu of a solvent a plasticizer may be employed to render the surface soft and adapted to receive the polarizing particles. Where a solvent is employed, a volatile solvent is preferable. So also, where a plasticizer is employed, the plasticizer may either volatilize or may gradually disperse throughout the supporting sheet, thus, if desired, altering to some extent, and in a predetermined manner, the properties thereof.

A suitable plasticizer or solvent for use in connection with the process of the invention where cellulose acetate is employed as the supporting element is a mixture of three parts of ethyl acetate and one part of methanol. If the supporting element comprises Vinylite XYSG the solvent employed may be Cellosolve, or methyl Cellosolve or methanol.

It will be apparent that other solvents may be employed and that where other resins or transparent supporting plates are employed it may be necessary to use such other solvents. It should be remembered that the solvent or plasticizer used in the invention should preferably be one which does not alter the polarizing properties of the polarizing crystals and, in this connection, if a solvent for the crystals is employed, it should be in the form of a saturated solution of the crystals.

The process may be performed at room temperature. Smearing may be accomplished with any suitable instrument. In fact, for some purposes, a useful product may be obtained where the crystals are smeared with the hands, i. e., where they are rubbed vigorously into the softened surface of the transparent support with the thumb or fingers.

It will be apparent also that a polarizing layer may be incorporated in each surface of the transparent support. Under certain circumstances, this may be desirable, as for example where it is desired to employ an exceedingly thin polarizing layer and where it may be necessary to supplement the polarization of one layer by that of another to secure substantially complete polarization of the transmitted beam. Under certain circumstances, it may even be desirable to incorporate crystals in both faces of the supporting sheet, but to orient the crystals on one face in a direction at a predetermined angle to the direction of orientation of the crystals on the other face.

The polarizer of the present invention may be employed wherever light-polarizing material may be used.

Since certain changes in carrying out the above process may be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A process comprising applying to a surface of a light-transmitting element of organic plastic material a material from the group consisting of the solvents and plasticizers for said element to soften said surface, applying to said softened surface a light-polarizing material in the form of minute needle-shaped light-polarizing particles having their polarizing axes coinciding with their needle axes, and orienting the polarizing axes of adjacent particles by pressing said particles into intimate contact with said softened surface, the said pressing of said particles acting to orient the polarizing axes thereof.

2. A process comprising applying to a surface of a light-transmitting element of organic plastic material a material from the group consisting of the solvents and plasticizers for said element to soften said surface, applying to said softened surface a light-polarizing material in the form of minute needle-shaped light-polarizing particles having their polarizing axes coinciding with their needle axes, orienting the polarizing axes of adjacent particles by pressing said particles into intimate contact with said softened surface and rubbing said particles in substantially a single direction and causing said surface to harden.

3. A process comprising applying to a surface of a light-transmitting element of organic plastic material a material from the group consisting of the solvents and plasticizers for said element to soften said surface, applying simultaneously to said surface a light-polarizing material in the form of minute needle-shaped light-polarizing particles having their polarizing axes coinciding with their needle axes, orienting the polarizing axes of adjacent particles by orienting their needle axes, and pressing said particles into intimate contact with said softened surface.

4. A process comprising applying to a surface of a light-transmitting element of organic plastic material a material from the group consisting of the solvents and plasticizers for said element to soften said surface, applying to said softened surface a light-polarizing material in the form of minute needle-shaped light-polarizing particles having their polarizing axes coinciding with their needle axes, orienting the polarizing axes of adjacent particles by smearing said particles into said surface in substantially a single direction, and pressing said particles into intimate contact with said softened surface.

5. A process comprising applying to a surface of a light-transmitting element of organic plastic material a material from the group consisting of the solvents and plasticizers for said element to soften said surface, applying to said softened surface a light-polarizing material in the form of minute needle-shaped light-polarizing particles having their polarizing axes coinciding with their needle axes, orienting the polarizing axes of adjacent particles by orienting their needle axes, and pressing said particles into intimate contact with said softened surface while orienting the needle axes of said particles.

6. A process comprising applying to a surface of a light-transmitting element of organic plastic material a solvent for said surface to soften said surface, applying to said surface a light-polarizing material in the form of minute needle-shaped light-polarizing particles, orienting the polarizing axes of adjacent particles, and pressing said particles into said softened surface.

7. A process comprising applying to a surface of a light-transmitting element of organic plastic material a plasticizer for said surface to soften said surface, applying to said surface a light-polarizing material in the form of minute needle-shaped light-polarizing particles, orienting the polarizing axes of adjacent particles, and pressing said particles into said softened surface.

EDWIN H. LAND.